US006893711B2

(12) United States Patent
Williamson et al.

(10) Patent No.: US 6,893,711 B2
(45) Date of Patent: May 17, 2005

(54) ACOUSTICAL INSULATION MATERIAL CONTAINING FINE THERMOPLASTIC FIBERS

(75) Inventors: Bruce Scott Williamson, Alpharetta, GA (US); Nina Frazier, Marietta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 256 days.

(21) Appl. No.: 10/212,410

(22) Filed: Aug. 5, 2002

(65) Prior Publication Data

US 2004/0023014 A1 Feb. 5, 2004

(51) Int. Cl.[7] .................................................. B32B 25/10

(52) U.S. Cl. ................. 428/297.1; 428/903; 428/296.7; 181/296; 181/290; 181/286

(58) Field of Search ............................. 428/903, 297.1, 428/296.7; 181/296, 290, 286

(56) References Cited

U.S. PATENT DOCUMENTS

| | | | | |
|---|---|---|---|---|
| 3,773,605 A | | 11/1973 | Pihlstrom | |
| 3,802,817 A | | 4/1974 | Matsuki et al. | |
| 4,420,526 A | | 12/1983 | Schilling et al. | |
| 4,568,581 A | | 2/1986 | Peoples, Jr. | |
| 4,837,067 A | | 6/1989 | Carey, Jr. et al. | |
| 4,851,283 A | | 7/1989 | Holtrop et al. | |
| 4,863,785 A | | 9/1989 | Berman et al. | |
| 5,286,929 A | | 2/1994 | Kazama et al. | |
| 5,298,694 A | * | 3/1994 | Thompson et al. | 181/286 |
| 5,399,423 A | | 3/1995 | McCullough et al. | |
| 5,407,739 A | | 4/1995 | McCullough et al. | |
| 5,466,516 A | | 11/1995 | Lutzow et al. | |
| 5,501,872 A | | 3/1996 | Allen et al. | |
| 5,582,905 A | | 12/1996 | Beck et al. | |
| 5,584,950 A | | 12/1996 | Gaffigan | |
| 5,624,726 A | | 4/1997 | Sanocki et al. | |
| 5,639,541 A | | 6/1997 | Adam | |
| 5,759,659 A | | 6/1998 | Sanocki et al. | |
| 5,773,375 A | | 6/1998 | Swan et al. | |
| 5,804,512 A | | 9/1998 | Lickfield et al. | |
| 5,841,081 A | | 11/1998 | Thompson et al. | |
| 5,958,322 A | | 9/1999 | Thompson et al. | |
| RE36,323 E | | 10/1999 | Thompson et al. | |
| 5,961,904 A | | 10/1999 | Swan et al. | |
| 5,983,586 A | | 11/1999 | Berdan, II et al. | |
| 6,110,588 A | | 8/2000 | Perez et al. | |
| 6,119,691 A | | 9/2000 | Angadjivand et al. | |
| 6,217,691 B1 | | 4/2001 | Vair, Jr. et al. | |
| 6,220,388 B1 | | 4/2001 | Sanborn | |
| 6,277,469 B1 | | 8/2001 | Wildeman | |
| 6,352,948 B1 | | 3/2002 | Pike et al. | |
| 6,358,592 B2 | | 3/2002 | Vair, Jr. et al. | |
| 6,371,749 B2 | | 4/2002 | Thompson et al. | |
| 6,720,068 B1 | * | 4/2004 | Vanbemmel et al. | 428/317.9 |

FOREIGN PATENT DOCUMENTS

| | | |
|---|---|---|
| WO | 01/49531 | 7/2001 |

OTHER PUBLICATIONS

V.A. Wente et al., "Manufacture of Superfine Organic Fibers", *NRL Report 4364* (111437), Naval Research Laboratory, Washington D.C., May, 1954.

* cited by examiner

*Primary Examiner*—Merrick Dixon
(74) *Attorney, Agent, or Firm*—Ralph H. Dean, Jr.

(57) ABSTRACT

The present invention relates an acoustical insulation material for sound attenuation containing a nonwoven web. Surprisingly, it has been discovered that an acoustical insulation material made from a nonwoven web of thermoplastic fibers having an average fiber diameter of less than about 7 microns, wherein the acoustical insulation has a thickness less than about 3 mm and a density of greater than about 50 kg/m$^3$ is effective as a sound insulation material. The acoustical insulation is very effective as an acoustical insulation material, despite the low thickness and high density of the acoustical insulation. A method of attenuating sound waves passing from a sound source area to a second area using the acoustical insulation material is also disclosed.

24 Claims, 1 Drawing Sheet

ACOUSTICAL INSULATION MATERIAL CONTAINING FINE THERMOPLASTIC FIBERS

FIELD OF THE INVENTION

The present invention relates to a nonwoven acoustical insulation material which can be used as acoustical insulation in vehicles, appliances, architectural applications and other locations where sound attenuation is desired or required.

BACKGROUND OF THE INVENTION

Many different sound insulation materials are available in the art. These materials have been used in a variety of applications, for example, to reduce noise from appliances, within buildings, from HVAC systems, within vehicles and the like. The selection of a particular sound insulation material is governed by several factors, including cost, thickness, weight and the ability to attenuate sound. Sound insulation attenuates sound by either absorbing sound waves striking the insulation or reflecting such sound waves outwardly and away from a receiving area. Sound attenuation is measured by the ability of a material to absorb incident sound waves (sound absorption) and/or by the ability of the material to reflect incident sound waves (transmission). Ideally, a sound attenuation material has a high sound absorption coefficient and/or a high transmission loss value.

Conventional sound insulating materials include materials such as foams, compressed fibers, fiberglass batts, felts and nonwoven webs of fibers. Of the nonwoven webs of fibers, meltblown fibers have been widely used in sound insulation materials. In addition, laminates of meltblown nonwoven webs have been used as acoustical insulation. In these prior uses of meltblown nonwoven webs in acoustical insulation, the meltblown nonwoven web typically was a relatively thick, low density layer of meltblown fibers, usually having a thickness of at least 5 mm and a density less than 50 kg $m^3$.

Examples of such meltblown containing acoustical insulation are described in U.S. Pat. No. Re 36,323 to Thompson et al.; U.S. Pat. No. 5,773,375 to Thompson et al.; U.S. Pat. No. 5,841,081 to Thompson et al. These patents teach laminates containing meltblown fibers; however, the laminates have the problem of dimensional stability, meaning that the laminate does not retain its shape during handling, including compaction of the fibers and tearing or breaking of parts molded out of this material.

Another acoustical insulation containing meltblown fibers is described in U.S. Pat. No. 6,217,691 to Vair et al. In this patent, a mat of meltblown fibrous insulation is produced from meltblown fibers having a mean fiber diameter of less than 13 microns, a density less than about 60 kg/$m^3$, preferably less than about 50 kg/$m^3$, and a thickness between 3 and 20 mm. In the production of acoustical insulation, the fibers at least one of the top and bottom surfaces of the meltblown are melted to form a thin integral skin. The resulting material is then point bonded to provide integrity to the mat. In addition, the integral skin layer is perforated to provide air permeability to the mat.

In U.S. Pat. No. 3,773,605 to Pihlilstrom, an acoustical insulation material is produced by fusing and integrating several layers of a meltblown nonwoven web to form a panel having a density between 0.01 and about 0.3 g/cc. The resulting nonwoven web has a thickness greater than about 7 mm.

It is generally accepted in the acoustical insulation art that low density and relatively high thickness meltblown nonwoven webs are needed for sound insulating properties. Therefore, there is a need in the art for a relatively thin sound insulating material which provides sound attenuation properties provided by bulkier materials used in the art.

SUMMARY OF THE INVENTION

The present invention relates to an acoustical insulation material for sound attenuation. Surprisingly, it has been discovered that an acoustical insulation material having a thickness less than about 3 mm and a density greater than about 50 kg/$m^3$, prepared from a nonwoven web of thermoplastic fibers having an average fiber diameter of less than about 7 microns, is very effective as a sound insulation material. The acoustical insulation material is very effective for sound attenuation, despite the low thickness and high density of the nonwoven web. The thermoplastic fibers used to prepare the acoustical insulation of the present invention may be meltblown fibers.

The present invention also relates to a method of attenuating sound waves passing from a sound source area to a second area. The method includes positioning an acoustical insulation material having a thickness less than about 3 mm and a density greater than about 50 kg/$m^3$ made from a nonwoven web of thermoplastic fibers having an average fiber diameter of less than about 7 microns, between the sound source area and the second area.

The sound insulation material of the present invention has other properties which are beneficial for attenuating sound. These additional properties include having a pressure drop at least about 1 mm water at a flow rate of about 32 liters/minute and a Frazier permeability less than about 75 cubic feet per minute per square foot (cfm/$ft^2$) (about 22.9 cubic meters per minute per square meter ($m^3$/min./$m^2$).

The present invention also includes articles of manufacture including the sound insulation material of the present invention.

DEFINITIONS

Figure 1:
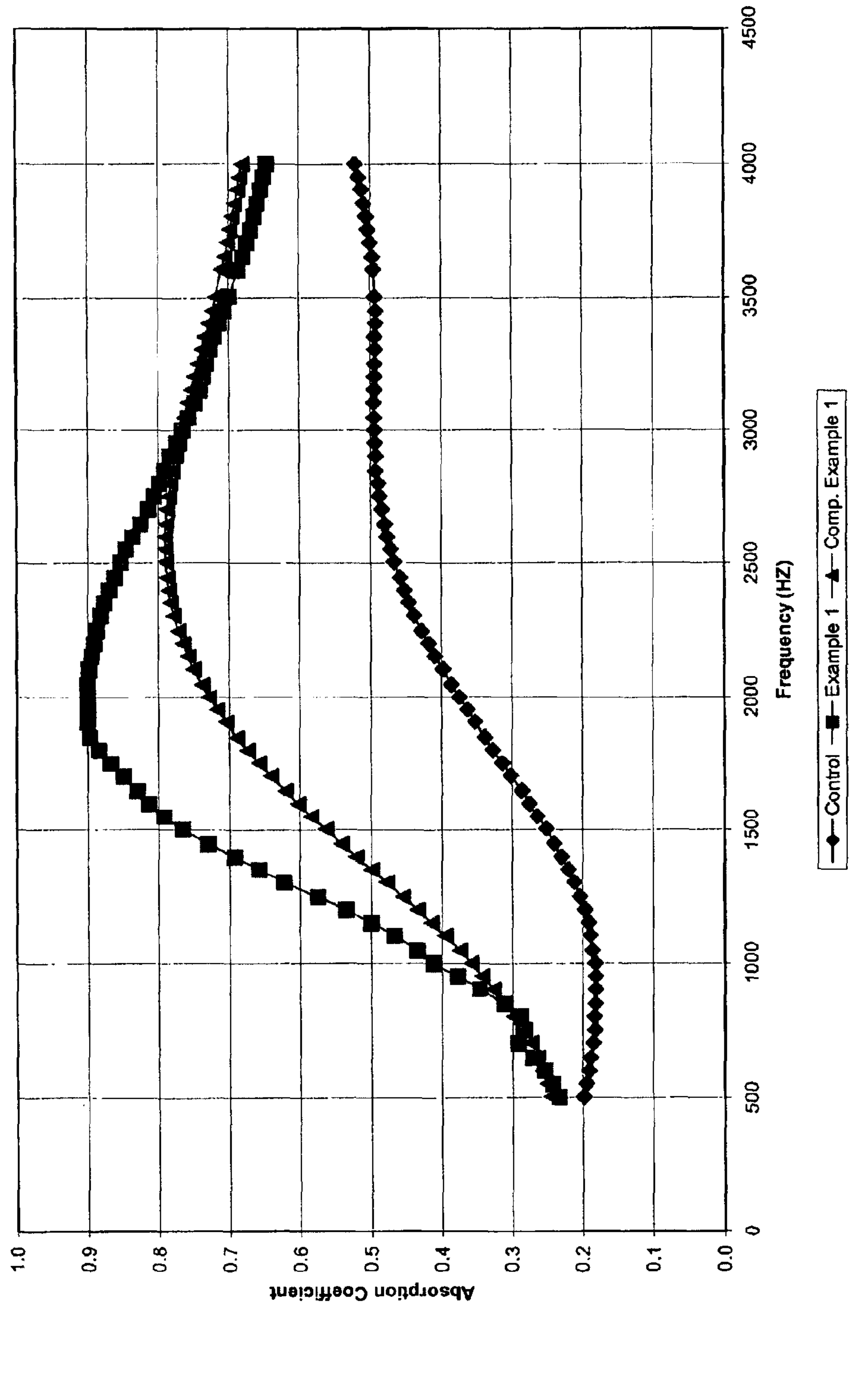
FIG. 1 is a graphical representation of the sound absorption of a sound insulation material of the present invention and comparative materials.

As used herein, the term "comprising" is inclusive or open-ended and does not exclude additional unrecited elements, compositional components, or method steps.

As used herein, the term "fiber" includes both staple fibers, i.e., fibers which have a defined length between about 19 mm and about 50 mm, fibers longer than staple fiber but are not continuous, and continuous fibers, which are sometimes called "substantially continuous filaments" or simply "filaments". The method in which the fiber is prepared will determine if the fiber is a staple fiber or a continuous filament.

As used herein, the term "nonwoven web" means a web having a structure of individual fibers or threads which are interlaid, but not in an identifiable manner as in a knitted web. Nonwoven webs have been formed from many processes, such as, for example, meltblowing processes, spunbonding processes, air-laying processes, coforming processes and bonded carded web processes. The basis weight of nonwoven webs is usually expressed in ounces of material per square yard (osy) or grams per square meter (gsm) and the fiber diameters useful are usually expressed in microns, or in the case of staple fibers, denier. It is noted that to convert from osy to gsm, multiply osy by 33.91.

As used herein, the term "meltblown fibers" means fibers formed by extruding a molten thermoplastic material through a plurality of fine, usually circular, die capillaries as molten threads or fibers into converging high velocity, usually hot, gas (e.g. air) streams which attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, which is hereby incorporated by reference in its entirety. Meltblown fibers are microfibers, which may be continuous or discontinuous, and are generally smaller than 10 microns in average diameter. The term "meltblown" is also intended to cover other processes in which a high velocity gas, (usually air) is used to aid in the formation of the fibers, such as melt spraying or centrifugal spinning.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "multicomponent fibers" refers to fibers or filaments which have been formed from at least two polymers extruded from separate extruders but spun together to form one fiber. Multicomponent fibers are also sometimes referred to as "conjugate" or "bicomponent" fibers or filaments. The term "bicomponent" means that there are two polymeric components making up the fibers. The polymers are usually different from each other, although conjugate fibers may be prepared from the same polymer, if the polymer in each component is different from one another in some physical property, such as, for example, melting point or the softening point. In all cases, the polymers are arranged in substantially constantly positioned distinct zones across the cross-section of the multicomponent fibers or filaments and extend continuously along the length of the multicomponent fibers or filaments. The configuration of such a multicomponent fiber may be, for example, a sheath/core arrangement, wherein one polymer is surrounded by another, a side-by-side arrangement, a pie arrangement or an "islands-in-the-sea" arrangement. Multicomponent fibers are taught in U.S. Pat. No. 5,108,820 to Kaneko et al.; U.S. Pat. No. 5,336,552 to Strack et al.; and U.S. Pat. No. 5,382,400 to Pike et al.; the entire content of each is incorporated herein by reference. For two component fibers or filaments, the polymers may be present in ratios of 75/25, 50/50, 25/75 or any other desired ratios.

As used herein, the term "multiconstituent fibers" refers to fibers which have been formed from at least two polymers extruded from the same extruder as a blend or mixture. Multiconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random.

As used herein, the term "pattern bonded" refers to a process of bonding a nonwoven web in a pattern by the application of heat and pressure or other methods, such as ultrasonic bonding. Thermal pattern bonding typically is carried out at a temperature in a range of from about 80° C. to about 180° C. and a pressure in a range of from about 150 to about 1,000 pounds per linear inch (59–178 kg/cm). The pattern employed typically will have from about 10 to about 250 bonds/inch$^2$ (1–40 bonds/cm$^2$) covering from about 5 to about 30 percent of the surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures, which patents are incorporated herein by reference. Ultrasonic bonding is performed, for example, by passing the multilayer nonwoven web laminate between a sonic horn and anvil roll as illustrated in U.S. Pat. No. 4,374,888 to Bornslaeger, which is hereby incorporated by reference in its entirety.

As used herein, the phrase "sound attenuation" refers to absorption and/or reflection of incident sound waves.

As used herein, the phrase "article of manufacture" refers to an article other than the sound insulation material of the present invention. Articles of manufacture include, for example, small appliances, such as blenders, food processors and the like; larger appliances, such as dish washers, refrigerators, clothes washing machines and the like; vehicles, such as automobiles, trucks, airplanes and the like; and buildings. Other articles which are intended to be included in this definition include articles which may be in need of sound attenuation properties.

DETAILED DESCRIPTION

The present invention provides an acoustical insulation material prepared from a nonwoven web of thermoplastic fibers. The acoustical insulation of the present is preferably prepared using a meltblowing process which forms a "meltblown" nonwoven web. Although the invention is described below in terms of the acoustical insulation being prepared from a meltblown nonwoven web, the nonwoven web may be prepared by other processes provided that the thermoplastic fibers have the average fiber diameter discussed below and the acoustical insulation material has the specified density. Meltblown nonwoven webs are known in the art and have been used in a wide variety of applications, including acoustical insulation. The meltblown nonwoven web of the acoustical insulation of the present invention is characterized in that it contains relatively closely distributed meltblown fibers that are randomly dispersed and autogenously bonded. These properties are responsible for the relatively high pressure drop and low permeability, which impart the sound attenuating properties to the acoustical material. The meltblown nonwoven web is very effective as an acoustical insulation material, despite the low thickness and high density of the nonwoven web.

The thermoplastic fibers have an average fiber diameter of less than about 7 microns. Preferably, the thermoplastic fibers have an average fiber diameter less than about 5 microns and more preferably between about 1.0 micron to about 4.0 microns and most preferably between about 2.0 microns to about 3.0 microns. If the average fiber diameter is greater than about 7 microns, the permeability of the acoustical insulation tends to be increased and the pressure drop of the acoustical insulation tends to be decreased, which corresponds to a decrease in the sound attenuating properties.

The acoustical insulation material of the present invention has a density of greater than about 50 kg/M$^3$. The upper limit of the density is not critical to the present invention;

however, from a practical standpoint of producing the meltblown nonwoven webs, the upper limit for the density is about 250 kg/M$^3$. Ideally, the density for the acoustical insulation material is between about 55 kg/M$^3$ and about 150 kg/M$^3$ and preferably about 58 kg/m$^3$ to about 100 kg/M$^3$.

Surprisingly, it has been discovered that an acoustical insulation material from meltblown nonwoven webs having a thickness less than 3 mm have sound attenuating properties. As is noted in the Background of the Invention, it has been generally preferred in the sound attenuation art that the meltblown acoustical insulation has a thickness greater than about 3 mm. It has been discovered that an acoustical insulation material from meltblown nonwoven webs having a thickness as low as about 0.2 mm has sound attenuating properties, provided that the meltblown fibers have a fiber diameter less than about 7 microns and the density of the acoustical insulation material is at least 50 kg/M$^3$. From a standpoint of cost and ability to prepare the high density and low loft meltblown nonwoven web, a thickness of up to about 3 mm is practical to produce. Higher thickness could be produced; however the cost of production would dramatically rise. It is preferred that the sound insulation material of the present invention has a thickness of about 0.2 mm to about 2.5 mm, more preferably between about 0.3 mm and 1.0 mm. The thickness of the acoustical insulation material is measured at 0.05 psi (3.5 g/cm$^3$) with a STARRET-7 type bulk tester. Samples were cut into 4 inch by 4 inch (10.2 cm by 10.2 cm) squares and five samples were tested to determine bulk or thickness.

Pressure drop is a measure of the force required to get a volume of air through a sheet. The acoustical insulation of the present invention preferably has a pressure drop at least about 1 mm water at a flow rate of about 32 liters/minute ("L/min."). More preferably, the pressure drop should be about 3 mm to about 12 mm water at a flow rate of about 32 L/min. The pressure drop is measured using ASTM F 778-88 test method.

The Frazier permeability of the acoustical insulation of the present invention should be less than about 75 cubic feet per minute per square foot (cfm/ft$^2$) (about 22.9 cubic meters per minute per square meter (m$^3$/min./m$^2$). Ideally, the Frazier permeability should be less than about 50 cfm/ft$^2$ and preferably less than about 30 cfm/ft$^2$. The Frazier permeability was tested using a Frazier Air Permeability tester available from Frazier Precision Instrument Company and measure in accordance with Federal Test Method 5450, Standard No. 191A (ASTM D737-96).

The thermoplastic fibers are preferably prepared from thermoplastic polymers. Suitable thermoplastic polymers useful in the present invention include polyolefins, polyesters, polyamides, polycarbonates, polyurethanes, polyvinylchloride, polytetrafluoroethylene, polystyrene, polyethylene terephathalate, biodegradable polymers such as polylactic acid and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly (1-butene) and poly(2-butene); polypentene, e.g., poly(1-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof.

Many polyolefins are available for fiber production, for example polyethylenes such as Dow Chemical's ASPUN 6811A linear low-density polyethylene, 2553 LLDPE and 25355 and 12350 high density polyethylene are such suitable polymers. The polyethylenes have melt flow rates in g/10 min. at 190° F. and a load of 2.16 kg, of about 26, 40, 25 and 12, respectively. Fiber forming polypropylenes include, for example, Basell's PF-015 polypropylene. Many other polyolefins are commercially available and generally can be used in the present invention. The particularly preferred polyolefins are polypropylene and polyethylene.

Examples of polyamides and their methods of synthesis may be found in "Polymer Resins" by Don E. Floyd (Library of Congress Catalog number 66-20811, Reinhold Publishing, N.Y., 1966). Particularly commercially useful polyamides are nylon 6, nylon-6,6, nylon-11 and nylon-12. These polyamides are available from a number of sources such as Custom Resins, Nyltech, among others. In addition, a compatible tackifying resin may be added to the extrudable compositions described above to provide tackified materials that autogenously bond or which require heat for bonding. Any tackifier resin can be used which is compatible with the polymers and can withstand the high processing (e.g., extrusion) temperatures. If the polymer is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ® and ARKON® P series tackifiers are examples of hydrogenated hydrocarbon resins. ZONATAC® 501 Lite is an example of a terpene hydrocarbon. REGALREZ® hydrocarbon resins are available from Hercules Incorporated. ARKON® P series resins are available from Arakawa Chemical (USA) Incorporated. The tackifying resins such as disclosed in U.S. Pat. No. 4,787,699, hereby incorporated by reference, are suitable. Other tackifying resins which are compatible with the other components of the composition and can withstand the high processing temperatures, can also be used.

The meltblown fibers may be monocomponent fibers, meaning fibers prepared from one polymer component, multiconstituent fibers, or multicomponent fibers. The multicomponent fibers may have either of an A/B or A/B/A side-by-side configuration, a pie configuration or a sheath-core configuration, wherein one polymer component surrounds another polymer component. Any of the above described thermoplastic polymers may be used as each component of the multicomponent fibers. Selection of the thermoplastic polymers of multicomponent fibers can change the properties of the resulting fibers. For example, if the thermoplastic components are incompatible with one another, the bicomponent fibers may be split to form finer fibers with a stimulus, such as heat or high pressure water. Examples of possible splitting methods are described in detail in U.S. Pat. No. 5,759,926 to Pike et al., which is hereby incorporated by reference in its entirety. If the melting points of the individual thermoplastic polymers are different from one other, it is possible to crimp the fibers by applying heat to activate the crimp. In forming the bicomponent fibers which can be used as the meltblown fibers of the present invention, it is desirable to produce fibers which are splittable, to drive down the average fiber diameter of the fibers upon splitting. If split fibers are not desired, it is generally preferred to use side-by-side fibers from similar polymers, such as polyolefins. A preferred multicomponent fiber configuration is a side-by-side multicomponent filament where at least one component contains polyethylene and at least one component contains polypropylene.

The meltblown nonwoven web used in the acoustical insulation material can be made by any process known in the art. An exemplary process is disclosed in U.S. Pat. No. 3,849,241 to Butin et al., where air-borne fibers, which are not fully quenched, are carried by a high velocity gas stream and deposited on a collecting surface to form a web of randomly dispersed and autogenously bonded meltblown fibers. As is known in the art, the flow rate, temperature and pressure of the high velocity gas stream can be adjusted to form continuous meltblown fibers or discontinuous fibers. In addition, the flow rate, temperature and pressure of the high velocity gas stream can be adjusted to change the average fiber diameter and other properties of the fibers. The meltblown nonwoven web may be formed using a single meltblown die or a series of meltblown dies.

The physical attributes, such as abrasion resistance or tear strength, of the acoustical insulation can be improved by pattern bonding the meltblown nonwoven web, or other process such as meltblowing a layer of meltblown fibers having an average fiber diameter greater than about 10 microns. Pattern bonding can be accomplished by thermal bonding or ultrasonic bonding.

Alternatively, the surface of the acoustical insulation can be made abrasive and/or abrasion resistant by meltblowing a relatively light layer of coarse meltblown fibers onto the surface. This may be accomplished by adding a second meltblown die in line with the meltblown die producing the fine fiber meltblown nonwoven web or by rolling the nonwoven web of the fine fibers and unrolling the fine fiber nonwoven and meltblowing the coarse meltblown fibers onto the fine fiber meltblown, such as the process shown in U.S. Pat. No. 4,659,609 to Lamers et al, which is hereby incorporated by reference. In the practice of this invention, the average fiber diameter of the coarse meltblown fibers is at least about 10 microns, and preferably between about 15 microns and about 39 microns.

As is known in the art, the characteristics of the meltblown fibers can be adjusted by manipulation of the various process parameters used for each extruder and die head in carrying out the meltblowing process. The following parameters can be adjusted and varied for each extruder and die head in order to change the characteristics of the resulting meltblown fibers:

1. Type of Polymer,
2. Polymer throughput (pounds per inch of die width per hour—PIH),
3. Polymer melt temperature,
4. Air temperature,
5. Air flow (standard cubic feet per minute, SCFM, calibrated the width of the die head),
6. Distance from between die tip and forming belt and
7. Vacuum under forming belt.

An additional advantage of using fine fiber meltblown in an acoustical insulation is that the fine fiber meltblown also acts as a moisture barrier, preventing moisture from passing through the insulation material. Even though that the acoustical insulation has these moisture barrier properties, the material still allows for air to pass through the structure.

In using the acoustical insulation of the present invention, the acoustical insulation is placed between a sound source area and a second area. The acoustical insulation attenuates the sound coming from the source area by absorbing the sound and/or by reflecting such sound waves outwardly and away from a receiving area. The meltblown acoustical insulation of the present invention has both sound absorbing and sound reflecting capabilities.

The acoustical insulation material of the present invention can be used in a wide variety of locations where sound attenuation is desired but little space is provided for a sound attenuating material. Examples of possible uses include small appliances, large appliances, vehicles such as cars, airplanes and the like, architectural applications such as in homes, commercial buildings and in HVAC systems.

The acoustical insulation materials of the present invention were tested for absorption using a Model # 4206 impedance tube available from Bruel & Kjaer. The test procedures in accordance with ASTM E1050-98 were followed. The absorption coefficient was recorded and graphed. The meltblown material of the present invention is very effective as a sound absorbing material up to a frequency of about 4.0 kHz.

EXAMPLES

Control Example 1

As a control example, the calibration constant associated with the impedance tube was tested for sound absorption. The resulting sound absorption data was plotted and is shown in FIG. 1.

Example 1

A fine fiber meltblown nonwoven web having fiber with an average fiber diameter of about 3 microns, a basis weight of 60 grams per square meter (gsm), a bulk of 0.064 cm and a density of about 94 kg/m$^3$ available from Kimberly-Clark Corporation, Roswell, Ga., was placed in front of the calibration constant used in Control Example 1, such that the meltblown material was place between the sound source and the calibration contant. The calibration constant was used to hold the meltblown in place while it was being tested for sound absorption. The meltblown nonwoven web was place between the sound source and the calibration constant. The resulting sound absorption data was plotted was plotted and shown in FIG. 1.

Control Example 2

Example 1 was repeated except that the calibration constant was placed in between the sound source and the meltblown material of Example 1. The exact same sound absorption curve as obtained in Control Example 1 was obtained.

Comparative Example 1

A commercially available meltblown acoustical insulation material the from Strandtek International, Florida The material has a basis weight of 263 gsm, a bulk 0.76 cm, and a bulk density of 35 kg/m$^3$. The resulting sound absorption data was plotted and is shown in FIG. 1.

As can be seen in FIG. 1, the acoustical insulation material is superior (at frequencies below about 2.5 kHz) to or about equal to the commercially available acoustical insulation material in sound absorption, even though the nonwoven web has a thickness less than 1/10 of the thickness of the commercially available material. In addition, the control examples show that calibration constant was not a factor in the sound absorption of the meltblown material.

While the invention has been described in detail with respect to specific embodiments thereof, and particularly by the example described herein, it will be apparent to those skilled in the art that various alterations, modifications and other changes may be made without departing from the spirit and scope of the present invention. It is therefore intended that all such modifications, alterations and other changes be encompassed by the claims.

We claim:

1. An acoustical insulation material nonwoven web comprising thermoplastic fibers having an average fiber diameter of less than about 7 microns, wherein the acoustical insulation material has a thickness less than about 3 mm and a density greater than about 50 $kg/m^3$.

2. The acoustical insulation material of claim 1, wherein the thermoplastic fibers have an average fiber diameter of less than about 5 microns.

3. The acoustical insulation material of claim 2, wherein the thermoplastic fibers have an average fiber diameter of about 1.0 microns to about 4.0 microns.

4. The acoustical insulation material of claim 1, wherein the thickness of the acoustical insulation is between about 0.2 mm to about 2.5 mm and the density of the acoustical insulation is between about 55 $kg/m^3$ and about 150 $kg/m^3$.

5. The acoustical insulation material of claim 1, wherein the thickness of the acoustical insulation is between about 0.3 mm to about 1.0 mm and the density of the acoustical insulation is between about 58 $kg/m^3$ and about 100 $kg/m^3$.

6. The acoustical insulation material of claim 3, wherein the thickness of the acoustical insulation is between about 0.3 mm to about 1.0 mm and the density of the acoustical insulation is between about 58 $kg/m^3$ and about 100 $kg/m^3$.

7. The acoustical insulation material of claim 1, wherein the thermoplastic fibers comprise a thermoplastic polymer selected from the group consisting of polyolefins, polyesters, polyamides, polycarbonates, polyurethanes, polyvinylchloride, polytetrafluoroethylene, polystyrene, polyethylene terephathalate, polylactic acid and copolymers and blends thereof.

8. The acoustical insulation material of claim 7, wherein the thermoplastic polymer comprises a polyolefin.

9. The acoustical insulation material of claim 8, wherein the polyolefin comprises polypropylene.

10. The acoustical insulation material of claim 1, wherein the nonwoven web is a material has a pressure drop of at least 1 mm of water at a flow rate of about 32 liters/min.

11. The acoustical insulation material of claim 10, wherein the pressure drop is between about 3 mm and about 10 mm of water at a flow rate of about 32 liters/min.

12. The acoustical insulation material of claim 1, wherein the thermoplastic fibers comprise monocomponent fibers.

13. The acoustical insulation material of claim 1, wherein the thermoplastic fibers comprise multicomponent fibers.

14. The acoustical insulation material of claim 13, wherein the multicomponent fibers have a side-by-side configuration.

15. The acoustical insulation material of claim 14, wherein the multicomponent fibers comprises at least one component comprising polyethylene and at least one component comprising polypropylene.

16. The acoustical insulation material of claim 13, wherein the multicomponent fibers are splitable.

17. The acoustical insulation material of claim 13, wherein the thickness of the acoustical insulation is between about 0.2 mm to about 2.5 mm and the density of the acoustical insulation is between about 55 kg $m^3$ and about 150 $kg/m^3$.

18. The acoustical insulation material of claim 1, wherein the nonwoven web is bonded.

19. The acoustical insulation material of claim 1, wherein the nonwoven web is a meltblown nonwoven web and further comprises a second layer of coarse meltblown fibers having an average fiber diameter greater than about 10 microns.

20. The acoustical insulation material of claim 1, wherein the thermoplastic fibers are meltblown thermoplastic fibers.

21. An article of manufacture comprising the acoustical insulation of claim 1.

22. A method of attenuating sound waves passing from a sound source area to a second area comprising positioning the acoustical insulation material of claim 1 between the sound source area and the second area.

23. A method of attenuating sound waves passing from a sound source area to a second area comprising positioning the acoustical insulation material of claim 4 between the sound source area and the second area.

24. A method of attenuating sound waves passing from a sound source area to a second area comprising positioning the acoustical insulation material of claim 6 between the sound source area and the second area.

* * * * *